Patented Aug. 31, 1937

2,091,743

UNITED STATES PATENT OFFICE 2,091,743

2-AMINO-1-HYDROXYNAPHTHALENE SULPHONIC ACIDS AND PROCESS OF PRODUCING SAME

Fritz Straub and Peter Pieth, Basel, Switzerland, assignors to the firm of Society of Chemical Industry in Basle, Basel, Switzerland No Drawing. Original application December 5, 1935, Serial No. 53,102. Divided and this application April 27, 1936, Serial No. 76,694. In Switzerland December 18, 1934

4 Claims. (Cl. 260—129)

This is a division of our application for patent Serial No. 53,102, filed in the United States on December 5, 1935, and in Switzerland on December 18, 1934.

It has been found that 2-amino-1-hydroxynaphthalene sulphonic acids of the general formula

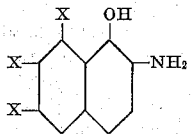

wherein two X's represent hydrogen and one X represents a sulpho group, may be produced by heating with acids in an aqueous medium 2-amino-1-hydroxynaphthalene-4-sulphonic acids of the general formula

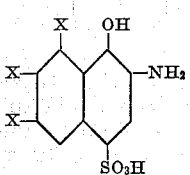

wherein two X's represent hydrogen and one X represents a sulpho group.

As parent materials for the manufacture of the 2-amino-1-hydroxynaphthalene sulphonic acids of the general formula

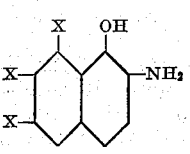

wherein two X's represent hydrogen and one X represents a sulpho group, there may be named 2-amino-1-hydroxynaphthalene-4,6-disulphonic acid, 2-amino-1-hydroxynaphthalene-4,7-disulphonic acid and the 2-amino-1-hydroxynaphthalene-4,8-disulphonic acid.

As acids with which the 2-amino-1-hydroxynaphthalene sulphonic acids of the general formula

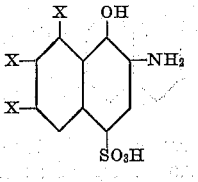

wherein two X's represent hydrogen and one X represents a sulpho group, may be heated in an aqueous medium, in which operation hydrogen takes the place of the sulphonic acid group in the 4-position, there may be used inorganic acids, as well as aliphatic, aromatic and hydroaromatic sulphonic acids and carboxylic acids. Such acids are, for instance, hydrochloric acid, sulphuric acid, phosphoric acid, formic acid, acetic acid, benzene- and naphthalene-mono-, di- and polysulphonic acids, benzene sulphocarboxylic acids and tetrahydronaphthalene sulphonic acids. A particularly smooth reaction attends the use of aqueous media rendered acid with mineral acid, and of these aqueous media containing sulphuric acid are especially suitable.

The operation of heating the 2-amino-1-hydroxynaphthalene-4-sulphonic acid in aqueous media with acids may be conducted under pressure or in an open vessel, in presence or absence of organic solvents or suspension agents, for instance alcohols.

The following examples illustrate the invention, the parts being by weight unless otherwise stated:—

Example 1

244 parts of naphthalene-1-sulphonic acid ($C_{10}H_8O_3S+2H_2O$) are dissolved in 200 parts of water. A solution of 32 parts of 2-amino-1-hydroxynaphthalene-4,8-disulphonic acid in 200 parts of water is added and the whole is heated to boiling for 30 hours, whereupon the 2-amino-1-hydroxynaphthalene-8-sulphonic acid of the formula

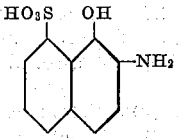

which has been formed separates in the form of a crystalline powder, which is filtered, washed and dried. The 2-amino-1-hydroxynaphthalene-8-sulphonic acid represents a colorless powder insoluble in water and dilute acids, but soluble in dilute alkalies to an olive-green solution which becomes rapidly darker in the air.

Instead of naphthalene-1-sulphonic acid, naphthalene-2-sulphonic acid can be used.

Example 2

32 parts of 2-amino-1-hydroxynaphthalene-4,6-disulphonic acid are dissolved in 200 parts of water, 200 parts of concentrated sulphuric acid are added and the whole is boiled for 30 hours under reflux. On cooling, 2-amino-1-hydroxynaphthalene-6-sulphonic acid of the formula

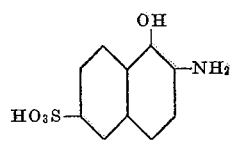

separates in crystalline form. When filtered it is obtained in the form of a colorless powder which dissolves rather sparingly in cold water and in dilute mineral acids but dissolves in dilute alkalies to an olive-green solution which gradually becomes darker in the air.

In similar manner 2-amino-1-hydroxynaphthalene-7-sulphonic acid is made from the 2-amino-1-hydroxynaphthalene-4,7-disulphonic acid.

*Example 3*

32 parts of 2-amino-1-hydroxynaphthalene-4,8-disulphonic acid are dissolved in 380 parts of water, 200 parts of concentrated sulphuric acid are added and the whole is boiled under reflux for 30 hours. The 2-amino-1-hydroxynaphthalene-8-sulphonic acid which has been produced by elimination of the sulpho-group in 4-position, precipitates in a crystalline form. When filtered and washed with water it is a colorless powder, insoluble in water and in dilute mineral acids but soluble in dilute alkalies to an olive-green solution, which rapidly becomes darker in the air.

The same result is attained by substituting for the sulphuric acid another mineral acid, for example hydrochloric acid or phosphoric acid.

*Example 4*

16 parts of 2-amino-1-hydroxynaphthalene-4,8-disulphonic acid are dissolved in 240 parts of water and, after addition of 61 parts by volume of hydrochloric acid of 30 per cent. strength, the whole is boiled under reflux for 30 hours. In the course of the reaction the 2-amino-1-hydroxynaphthalene-8-sulphonic acid separates in the form of a crystalline precipitate in good yield; it is filtered, washed with water and dried.

*Example 5*

32 parts of 2-amino-1-hydroxynaphthalene-4,8-disulphonic acid are dissolved in 368 parts by volume of a solution of orthophosphoric acid of 40 per cent. strength and the solution is boiled under reflux for 30 hours. The 2-amino-1-hydroxynaphthalene-8-sulphonic acid, which separates on cooling, is filtered, washed with water and dried.

Instead of ortho-phosphoric acid, meta-phosphoric acid or phosphorous acid may be used.

*Example 6*

16 parts of 2-amino-1-hydroxynaphthalene-4,8-disulphonic acid and 162 parts of naphthalene-1,5-disulphonic acid are mixed with 300 parts of water and the whole is heated to boiling under reflux for 24 hours. The solution is filtered from 2-amino-1-hydroxynaphthalene-8-sulphonic acid which has separated and to the filtrate, which still contains a small quantity of unchanged disulphonic acid, 16 parts of 2-amino-1-hydroxynaphthalene-4,8-disulphonic acid and 81 parts of naphthalene-1,5-disulphonic acid are added and the mixture is boiled again for 24 hours under reflux. The 2-amino-1-hydroxynaphthalene-8-sulphonic acid thus formed is isolated by filtration. In this manner 2-amino-1-hydroxynaphthalene-8-sulphonic acid is obtained in good yield.

Instead of dry naphthalene-1,5-disulphonic acid, an aqueous solution thereof may be used.

*Example 7*

A mixture of 32 parts of 2-amino-1-hydroxynaphthalene-4,8-disulphonic acid and 250 parts by volume of sulphuric acid of 40 per cent. strength is boiled for 20 hours under reflux. From the solution thus produced, 2-amino-1-hydroxynaphthalene-8-sulphonic acid separates. It is filtered; to the filtrate, which still contains unchanged 2-amino-1-hydroxynaphthalene-4,8-disulphonic acid there are added another 32 parts of 2-amino-1-hydroxynaphthalene-4,8-disulphonic acid and 10 parts of concentrated sulphuric acid and the whole is boiled for 20 hours under reflux. The 2-amino-1-hydroxy-naphthalene-8-sulphonic acid thus obtained is filtered and united with the acid obtained by the first boiling. The yield is very good.

*Example 8*

16 parts of 2-amino-1-hydroxynaphthalene-4,7-disulphonic acid are heated under reflux in 200 parts of sulphuric acid of 50 per cent. strength until the 4-sulphonic-group is eliminated. By filtration there is obtained the 2-amino-1-hydroxynaphthalene - 7 - sulphonic acid of the formula

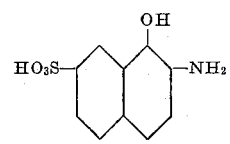

in the form of a white powder somewhat sparingly soluble in cold water and in dilute mineral acid but freely soluble in dilute alkalies to an olive-green solution which rapidly becomes darker on standing in the air.

The same result is attained by using instead of sulphuric acid, naphthalene-1-sulphonic acid, naphthalene-2-sulphonic acid or naphthalene-di- or -poly-sulphonic acids, benzene-sulphonic acid, a di- or poly-sulphonic acid of the benzene or a mineral acid. The sulphonic-group may also be eliminated under pressure.

In analogous manner from mixtures of 2-amino-1-hydroxynaphthalene-4,6- and 4,7-disulphonic acids, as obtained for example by sulphonation of 2-amino-1-hydroxynaphthalene-4-sulphonic acid, mixtures of 2-amino-1-hydroxynaphthalene-6- and 7-sulphonic acids are obtained. These may find application in the form of mixtures.

What we claim is:—

1. Process for the manufacture of 2-amino-1-hydroxynaphthalene sulphonic acids of the general formula

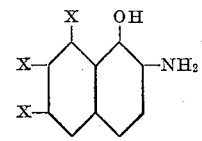

wherein two X's represent hydrogen and one X represents a sulpho group, consisting in heating with non-oxidizing acids in an aqueous medium 2-amino-1-hydroxynaphthalene-4-sulphonic acids of the general formula

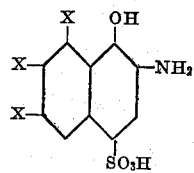

wherein two X's represent hydrogen and one X represents a sulpho group.

2. Process for the manufacture of 2-amino-1-hydroxynaphthalene sulphonic acids of the general formula

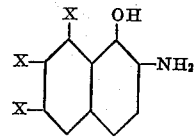

wherein two X's represent hydrogen and one X represents a sulpho group, consisting in heating with non-oxidizing mineral acids in an aqueous medium 2-amino-1-hydroxynaphthalene-4-sulphonic acids of the general formula

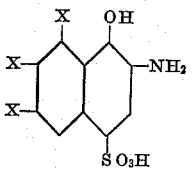

wherein two X's represent hydrogen and one X represents a sulpho group.

3. Process for the manufacture of 2-amino-1-hydroxynaphthalene sulphonic acids of the general formula

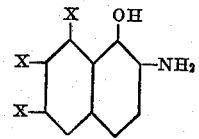

wherein two X's represent hydrogen and one X represents a sulpho group, consisting in heating with sulphuric acid in an aqueous medium 2-amino-1-hydroxynaphthalene-4-sulphonic acids of the general formula

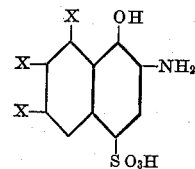

wherein two X's represent hydrogen and one X represents a sulpho group.

4. 2-amino-1-hydroxynaphthalene-6-sulphonic acid of the formula

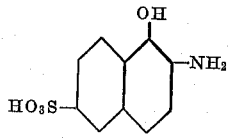

which product is a colorless powder sparingly soluble in water and dilute acids, but dissolving in dilute alkalies to an olive green solution which becomes darker in the air.

FRITZ STRAUB.
PETER PIETH.